United States Patent Office 3,823,099
Patented July 9, 1974

3,823,099
THERMOSETTING UNSATURATED POLYESTER
FOAM PRODUCTS
Earl N. Doyle, 1737 Campbell Road,
Houston, Tex. 77055
No Drawing. Filed Sept. 24, 1971, Ser. No. 183,622
Int. Cl. C08g 41/04, 22/44
U.S. Cl. 260—2.5 BE                35 Clams

ABSTRACT OF THE DISCLOSURE

Thermosetting unsaturated polyester foams are prepared by initiating a blowing reaction and a curing reaction in a thermosetting, unsaturated polyester resin mix. The blowing reaction comprises reacting *in situ* a small amount of a polyisocyanate compound and a hydrogen donor compound exothermically reactive therewith so as to form a gaseous blowing agent prior to gelation of the thermosetting resin. The blowing reaction also accelerates the curing reaction such that the polyester resin attains a gel state during expansion of the resin by the gaseous blowing agent and cures in an expaned condition.

BACKGROUND OF THE INVENTION

Field of the Invention

This invention relates to two-component systems adapted to form thermosetting unsaturated polyester resin foam products, to methods for making such foam products and to the resulting foam products.

Summary of the Prior Art

In recent years, foamed synthetic resins such as the foamed polyurethanes have been used on an increasingly large scale for such divergent uses as the manufacture of pillows and structural members. Foamed synthetic resins are desirable for their cellular structure, which makes them inexpensive void-filling materials, excellent thermal insulators, as well as rendering them lightweight. The properties of such foamed resins may be varied from resilient and weak to rigid and very strong by varying the amount and type of resin components.

The art of foaming polyurethanes and epoxides has been known for over a decade. Although other thermosetting resins, such as ureas and phenolics have been successfully foamed, the only thermosetting foams to become widely used commercially have been the polyurethanes. The others have been less successful because of cost, lack of shelf stability, and difficulties in formulating. Two of the major advantages of the polyurethane foams have been their availability in simple, two-package systems and their capability of reacting over a rather wide range of ambient temperatures. These capabilities are especially advantageous when the material must be "foamed in place," as might be desired for a thermal insulating layer between the walls of a building, flotation material for boats and barges and for other uses as apparent to those skilled in the art.

Polyurethane foams have been prepared in the past by reacting hydroxyl-terminated intermediate polyester compounds ("polyols") containing a substantial excess of hydroxyl substituents with a substantial amount of polyisocyanates. See, for example, United States Pats. Nos. 3,106,537, 3,304,273, 3,314,901, 3,391,093 and 3,404,-107. Due to the reaction of the isocyanate group with the free hydroxyl groups in the polyester chain, sufficient exothermic heat is generated to provide the energy for the generation of a gas to produce the expanded structure. As a result of the isocyanate/hydroxy group reaction, the foamed products from such reactions contain a substantial amount of polyurethane as part of the polymeric product. Hydroxyl and carboxyl-terminated polyester resins have also been used as plasticizers, especially in vinylic materials. Carboxyl-terminated polyester resins have also been used as curing agents for epoxy compounds.

Foams prepared from polyols also have a number of drawbacks in their formulation. For example, the "one-shot" method, wherein all of the ingredients are mixed simultaneously, provides a short cycle of cure and is therefore difficult to control and liberates unreacted excesses of diisocyanate. On the other hand, the "prepolymer" method, wherein the polyol and isocyanate are reacted to yield a prepolymer and the catalyst is mixed therewith to effect foaming, is more complicated and expensive due to the two-stage process involved.

Because of their lower cost and greater strength, a simple method of preparing foamed products consisting solely of thermosetting unsaturated polyesters at ambient temperatures has long been sought. The basic problem encountered in attempting to foam thermosetting unsaturated polyester resins by utilizing the exothermic heat of curing of the resin is that most of the exothermic heat of curing takes place after the polyester resin has reached an advanced stage of gelation in its cure; hence the resin is generally entirely too viscous to allow bubbles to be formed from a blowing agent, or, if such bubbles are formed, they are not allowed sufficient freedom to effectively form a uniform cellular structure throughout the resin. Although such unsaturated polyesters have been successfully foamed at carefully controlled higher temperature, e.g., about 120° C., no simple and efficient unsaturated thermosetting polyester composition which has a good shelf life, which may be successfully foamed over a fairly wide range of ambient temperatures, e.g., from about 40 to about 100° F., and which has desirable strength characteristics has heretofore been developed.

SUMMARY OF THE INVENTION

Accordingly, a primary object of the present invention is to provide a simple, efficient and economical method for the preparation of cellular thermosetting unsaturated polyester resins possessing desirable strength characteristics.

It is an object of this invention to provide a two component system having a long, stable shelf life which components are adapted to react at about ambient temperatures to form a cellular thermosetting unsaturated polyester resin product.

Another object is to provide a novel thermosetting unsaturated polyester resin composition which may be successfully foamed at ambient temperature.

It is also an object of this invention to provide a system and method useful to provide "foamed-in-place" thermosetting unsaturated polyester resins.

Other objects and advantages of the present invention will become apparent from thies summary and the description of the preferred embodiments.

One aspect of the present invention provides a method for the formation of a thermosetting unsaturated polyester resin foam product at about ambient temperatures comprising initiating a blowing reaction and a curing reaction in a thermosetting unsaturated polyester resin mix, the blowing reaction comprising the reaction of substantially stoichiometric amounts of a polyisocyanate compound and a hydrogen donor compound exothermically reactive with the isocyanate function to form a gaseous blowing agent in the mix during curing, the curing reaction comprising the catalytic reaction of a thermosetting unsaturated polyester resin substantially free from hydroxyl and carboxyl groups, a vinylic cross-linking monomer and a free radical catalyst, the exotherm heat of the blowing reaction accelerating the curing reaction such that the polyester resin attains a gel state during expansion of the resin by the gaseous blowing agent and cures in an expanded condition.

In accordance with another aspect, the present invention provides a two-component system adapted to react to form a thermosetting unsaturated polyester resin foam product comprising a first component comprising a thermosetting unsaturated polyester resin substantially free from hydroxyl and carboxyl groups, a vinylic cross-linking monmer and a hydrogen donor compound exothermically reactive with a polyisocyanate compound to expand a gaseous blowing agent, and a second component comprising polyisocyanate compound in an amount essentially stoichiometric with the amount of the hydrogen donor compound of the first component and a free radical catalyst adapted to catalyze the curing reaction of the thermosetting unsaturated polyester resin and vinylic cross-linking monomer.

In accordance with the present invention, it has been found that the heat from a first separate exothermic reaction, of a relatively small amount of a polyisocyanate with a hydrogen donor compound reactive therewith, may be utilized to form a gaseous blowing agent and thereby effectively foam the unsaturated polyester resin before the second reaction gels and cures the entire mass. The formation of the thermosetting unsaturated polyester resin foam product thus can take place at ambient temperatures, e.g., from about 40 to about 100° F. Because the thermosetting unsaturated polyester resin useful in the present invention contains substantially no free hydroxyl or carboxyl groups, the polyisocyanate is substantially unreactive with the polyester resin and the presence of the polyisocyanate alone in the resin mix is insufficient to bring about a blowing reaction. Furthermore, since no significant amount of hydroxyl and carboxyl groups is present in the thermosetting polyester, conventional general purpose polyester resins may be used, with only small amounts of the relatively expensive polyisocyanate compound needed.

The gaseous blowing agent may be formed by the reaction of the polyisocyanate with water, which liberates carbon dioxide, or by the vaporization of a low boiling liquid such as a halogenated alkane, the vaporization being substantially caused by the exothermic reaction of the polyisocyanate with the hydrogen donor compound.

In addition to supplying sufficient exothermic heat to form a gaseous blowing agent prior to the exothermic peak of the curing reaction, the reaction between the polyisocyanate compound and the hydrogen donor compound gives off heat that accelerates or promotes the curing of the thermosetting unsaturated polyester resin, helping to bring the polyester resin to gel state as substantially simultaneously with the maximum expansion of the foam as is possible so that the bubbles or cells retain their maximum diameter in the fully cured polyester resin.

While the individual components of the thermosetting unsaturated resin mix are each known to those skilled in the art, the present invention provides a novel combination yielding a heretofore unrealized commercially valuable product. The blown thermosetting unsaturated polyester resins of the present invention are useful in the manufacture of a wide variety of materials since they may have open or closed cells and may vary in strength and rigidity from strong and resilient to very strong and very rigid and in density from below about 2 to above about 35 pounds per cubic foot. The cellular resins of the present invention may be handled in the same manner as foamed polyurethanes, i.e., upon mixing the composition, it may be poured, sprayed, or frothed into molds or the desired location. The foam products of the present invention are highly polymerized and certain substantial amounts of polyester linkages, e.g., the major portions (i.e., at least about 50 percent and preferably at least about 70 percent) of the structure are polyester linkages spaced by small numbers of other linkages such as urea and urethane or urethane and allophanate depending on the particular hydrogen donor and blowing agent used. Regardless, the final product is characterized as a polyester in contradistinction to a polyurethane, polyepoxide, or other polymeric material.

DESCRIPTION OF THE PREFERRED EMBODIMENTS

The Thermosetting Unsaturated Polyester Resins

The unsaturated polyester resins useful in the present invention are usually prepared by the esterification of polybasic acids with polyhydric alcohols to give polyesters in which either the alcoholic or the acidic portion thereof possess the ethylenic unsaturation. The preferred class of unsaturated polyester resins is derived from the esterification reaction of (1) unsaturated polybasic acids, preferably in combination with saturated aliphatic or aromatic polybasic acids, and (2) polyhydric alcohols.

The unsaturated polybasic acid may be any unsaturated polybasic acid containing two or more carboxyl groups (COOH) and having at least one doubly bonded pair of adjacent carbon atoms ($>C=C<$) as part of the aliphatic, or aliphatic portion, of the acid. The term "unsaturated polybasic acid" as defined here also includes the corresponding anhydrides which contain one less molecule of water than the straight acids, e.g., maleic anhydride is the anhydride corresponding to maleic acid.

The preferred unsaturated polybasic acids include the alpha-unsaturated, alpha, beta-dicarboxylic acids such as maleic acid, fumaric acid, itaconic acid, citraconic acid, and their corresponding anhydrides. Maleic acid or its anhydride is most preferred.

The unsaturated polybasic acid may be replaced in part with up to an equivalent quantity of one or more saturated polybasic acids, such as succinic, adipic, sebacic, phthalic, azelaic, tetrahydrophthalic and endomethylene tetrahydrophthalic acids and their corresponding anhydrides. Other saturated acids include isophthalic, tetrachlorophthalic, chlorendic, hexahydrophthalic, glutaric and pimelic acids, and their corresponding anhydrides. Other saturated acids suitable for use herein will be apparent to those skilled in the art. The relative proportions of saturated polybasic acid to unsaturated acid modifies to some extent the rigidity of the polymerized mass. Generally, the higher the molar proportion of saturated acid to unsaturated acid, the more flexible the resultant polymer. Also, the type of saturated acid affects the rigidity of the polymerized mass. That is, sebacic, isophthalic, adipic and succinic acids all give a more flexible resin product than the same amount of phthalic anhydride. A further explanation of unsaturated polyester resins and methods for making them can be found in Doyle, *The Development and Use of Polyester Products*, McGraw-Hill (1969), (hereinafter referred to as "Polyester Products") which is herein incorporated by reference.

The polyhydric alcohols may be any polyhydric alcohol or glycol having two or more hydroxy groups (OH) and which react with either type of polybasic acid to form the corresponding polyester resin. Polyhydric alcohols which may be esterified with the above-described polybasic acids include glycerol, ethylene glycol, diethylene glycol, triethylene glycol, propylene glycol, dipropylene glycol, 1,4-butylene glycol, 1,3-butylene glycol, 2,3-butylene glycol, bis(4-hydroxyphenyl)dimethylmethane pentaerythritol, 1,4-butadiol, 1,5-pentanediol, and neopentyl glycol. The lower aliphatic glycols such as ethylene glycol, propylene glycol, and diethylene glycol are preferred.

The manner of making the unsaturated polyester resin from the above-described polybasic acids and polyhydric alcohols is well known and is not a part of the present invention per se. Further explanations of unsaturated polyester resins and methods for making them can also be found in Golding, *Polymers and Resins*, D. Van Nostrand Co., New York (1959); and Oleesky and Mohr, *Handbook of Reinforced Plastics*, Reinhold, New York (1964), both of which are also incorporated herein by reference.

It is essential in preparing the resin that sufficient amounts of hydroxyl groups and carboxyl groups be reacted to provide a polyester substantially free from carboxyl groups or hydroxyl groups. Generally, a slight excess of the polyhydric alcohol component is used in preparing the resin because of a loss as water during the reaction. In this manner, the resin prepared is "substantially free" from hydroxyl and carboxyl groups, that is, the resin has a hydroxyl number of less than 20, preferably less than 10, and most preferably substantially 0, and an acid value of less than 30, preferably less than 15 and most preferably substantially 0. The hydroxyl number of the polyester is expressed as the milligrams of KOH required to titrate a gram of sample in which the hydroxyls have been esterified with acetic anhydride. Similarly, the acid value represents the milligrams of KOH required to neutralize the carboxyl of the polyester. The resin prepared should also be substantially dry, having a water content of less than 0.15% by weight. The molecular weight of the resin may be from about 5,500 to about 8,000, preferably from about 6,000 to about 7,500, and most preferably from about 6,300 to about 7,000.

The rigidity of the final product may be controlled by selection of the thermosetting unsaturated polyester resin. For example, when a highly rigid end product, or one having a flexural modulus between about 600,000 and about 800,000 p.s.i. is desired, a highly rigid resin such as "ALTEC 6" brand polyester resin sold by Alpha Chemical Corp., and prepared from about 2.1 moles of propylene glycol, 1.0 moles of phthalic anhydride, 1.0 moles of maleic anhydride and 1.15 moles of styrene may be used. On the other hand, if a partially flexible end product is needed, e.g., one having a flexural modulus between about 300,000 and about 500,000 p.s.i. a resilient resin such as "ALTEC 4" brand polyester resin sold by Alpha Chemical Corp., and prepared from about 2.1 moles of propylene glycol, 1.2 moles of phthalic anhydride, 0.8 moles of maleic anhydride and 1.05 moles of styrene is suitable. Finally, if the cellular resin should be flexible, e.g., with a flexural modulus below about 200,000 p.s.i., a flexible resin such as "ALTEC 3" brand polyester resin, also sold by the Alpha Chemical Corp., and prepared from about 2.1 moles of propylene glycol, 1.6 moles of isophthalic anhydride, 0.4 moles of maleic anhydride and 1.0 moles of styrene should be used. Further details on selection of resins to achieve varying end product properties can be found, for example, in *"Polyester Products,"* page 283 et seq.

The most commonly used or thoroughly investigated monomers with which the polyester resin is mixed to form the thermosetting material and which act as cross-linkers are vinylic monomers such as styrene, methyl methacrylate, vinyltoluene, alpha-methyl styrene, dichlorostyrene, divinylbenzene, diallylphthalate, and triallyl cyanurate. Other monomers which may be used include methyl acrylate, ethyl acrylate, vinyl acetate, acrylonitrile, N-vinyl pyrrolidone, acrylamide, methacrylamide, maleimide, diallyl succinate, diallyl itaconate, triallyl aconitate and triallyl cyanurate. Of these, monomeric styrene compounds such as styrene itself are preferred as the vinylic cross-linking monomer because of their relatively low cost and relatively high effectiveness.

The term "monomeric styrene compound" as used herein is meant to mean styrene itself, or a polymerizable derivative thereof including vinyltoluene, alpha-methyl-styrene, the ethyl substituted styrenes such as alpha-ethylstyrene, and the mono and dichloro nuclear-substituted styrenes such as 4-chloro-1-vinylbenzene. Other suitable monomeric or polymeric polyester cross-linking materials may be substituted for part or all of the styrene.

A number of the useful cross-linking materials (as well as some of their important properties) are shown in *"Polyester Products,"* page 280.

The above-described thermosetting unsaturated polyester resin material usually contains some type or types of stabilizing or polymerization retarding inhibitors to prevent premature or too rapid polymerization or curing. Suitable stabilizing inhibitors may include hydroquinone, tert-butyl catechol, and phenyl hydrazine hydrochloride. Other inhibitors which may be used are listed in *"Polyester Products,"* page 285 and *Handbook of Reinforced Plastics*, supra at pages 31 to 33.

Wide and diverse catalyst-promoter systems and curing conditions may be used with the above-described thermosetting unsaturated polyester resin material. The particular catalyst-promoter system is chosen according to the particular application of the resin and the type of cure desired. Catalyst-promoter systems are well known in the art and are shown, for example, in *"Polyester Products,"* pages 292 and 298.

In general, any free radical catalyst which can open up the double bonds in the polyester linear chain to set in motion that portion of the polymerization or curing process designated as initiation is suitable. Usually, organic peroxides are employed as catalysts in most applications of the unsaturated polyester resin material and the corresponding curing conditions, e.g., temperatures and curing times, may be predicted and are well known. For example, the ketone peroxides such as methyl ethyl ketone peroxide, cyclohexanone peroxide, and bis (1-hydroxy cyclohexyl) peroxide, and the diacyl peroxides such as benzoyl peroxide, lauroyl peroxide and acetyl peroxide, may be used. The catalyst may be introduced into the thermosetting unsaturated polyester resin mix disposed within the pores of a molecular sieve. As known in the art, appropriately sized porous crystalline alumino silicate bodies can contain a suitable free radical catalyst, such as cumene hydroperoxide, disposed within the pores. The catalyst remains in the pores until displaced by a suitable displacing fluid such as water.

Often, certain "promoters" are used to activate decomposition of the above-described peroxide catalysts at temperatures below the normal decomposition and activation temperature of the particular peroxide. Promoter systems for these peroxides are well known. In the case of methyl ethyl ketone peroxide, for example, cobalt naphthenate, cobalt octoate and manganese naphthenate are used. For benzoyl peroxide, dimethyl aniline and diethyl aniline are used as the promoter. For cumene hyperoxide, lauryl mercaptan is used. Certain known catalysts are promoted only by heat and are activated at temperatures as low as about 120° F.

A further description of the well known catalyst-promoter systems and corresponding curing conditions for thermosetting unsaturated polyester resin material may be found in *"Polyester Products,* pages 292 and 298, and in the *Handbook Reinforced Plastics*, supra, at pages 30 to 51.

The Blowing Reaction

The blowing reaction which is utilized to form a gaseous blowing agent prior to gelation of the unsaturated thermosetting polyester resin comprises essentially the reaction of an isocyaate function with a hydrogen donor compound exothermically reactive therewith. Suitable hydrogen donor compounds include any compound containing two or more active hydrogens. Compounds containing such radicals as —CCOH, —OH, —NH$_2$, =NH, ≡N, —CONH$_2$, mercapto and quarternary ammonium are examples of of suitable hydrogen donor compounds. Water and tertiary amines such as N,N,N',N'-tetrakis-(2-hydroxypropyl) - ethylenediamine, isopropanolamine, triethylene diamine and other tertiary amines are excellent hydrogen donors. Alcohols may be suitable hydrogen donors. Other suitable hydrogen donors include primary and secondary amines, such as ethylene diamine. Other suitable hydrogen donors include 2-hydroxyethyl methacrylate, t-butylaminoethyl methacrylate, dimethylaminoethyl methacrylate, glycidyl acrylate, glycerine, sorbital, diethylene glycol, tripropylene glycol and mercapto esters containing both SH and OH groups. It is also within the scope of this invention to include polymeric materials such as hydroxy- or carboxy-containing saturated polyester resins or polyepoxide resins as the hydrogen donor. It should be understood, however, that the hydroxy- or carboxy-containing saturated polyester resins useful as a hydrogen donor for the blowing reaction are distinct from the thermosetting unsaturated polyester resins substantially free from hydroxyl and carboxyl groups which undergo a curing reaction to form the product of this invention. It should further be understood that regardless of the particular hydrogen donor used, the resulting product is a polyester. That is, the major portions of the structure (i.e., above about 50 percent, preferably at least about 70 percent) of the product are polyester linkages spaced by small numbers of other linkages such as urea and urethane or urethane and allophanate.

The isocyanates in the present invention must be di- or polyfunctional. Examples of suitable polyisocyanates are tolylene diisocyanates, hexamethylene diisocyanates, diphenylmethane diisocyanates, naphthalene diisocyanates, triphenylmethane triisocyanates, phenylene diisocyanates, bitolylene diisocyanates dianisidine diisocyanates, dimethyldiphenylmethane diisocyanates, triisocyanatodiphenyl ethers, etc. Specific examples include polymethylene polyphenyl isocyanate, metatoluene diisocyanate, 4,4'-diphenyl diisocyanate, 4,4'-diphenylene methane diisocyanate, 1,5-naphthalene diisocyanate, 4,4'-diphenyl ether diisocyanate, p-phenylene diisocyanate, ethylene diisocyanate, trimethylene diisocyanate, cyclohexylenee diisocyanate, 2-chloropropane diisocyanate, 2,2'-diethylether diisocyanate, 3-(dimethylamine)pentane diisocyanate, and 1,4 - tetrachlorophenylene diisocyanate. Other suitable polyisocyanates will be apparent to those skilled in the art. The function of the isocyanates is such that these are interchangeable although the particular isocyanate used must be used in an amount substantially stoichiometric to the amount of the hydrogen donor.

As is well known, when water reacts with the isocyanate radical, carbon dioxide is evolved, which may be utilized as the gaseous blowing agent itself. Gaseous blowing agents may also be formed by the vaporization of a low boiling liquid such as a halogenated alkane, the vaporization substantially caused by the exothermic heat of the reaction of the isocyanate and the hydrogen donor compound. By "substantially caused" is meant that the primary heat absorbed in the vaporization is that evolving from the isocyanate-hydrogen donor exothermic reaction. If the gaseous blowing agent is formed in such a manner, the liquid to be vaporized must have a boiling point which is generally less than or equal to the temperatures generated by the exothermic reaction between the polyisocyanate compound and the hydrogen donor compound. Generally, the liquid should be of such solubility in the polyester and/or isocyanate that its vapor pressure is greatly reduced and therefore becomes capable of handling without expensive high pressure apparatus. At the same time, the vapor pressure of the liquid should be such that, when dissolved in the polyester and/or isocyanate, it will readily vaporize at the exothermic reaction temperatures generated.

Suitable halogenated alkane type compounds include $CHClF_2$, $CHCl_2F$, $CCl_2F_2$, $C_2Cl_2F_4$, $CCl_3F$, chloroform, chlorinated solvents, etc. Of these, $CCl_3F$ is preferred. Such chemicals are manufactured and sold by E. I. du Pont de Nemours & Co., Inc., under the trade name "Freon."

If desired, both carbon dioxide and a low boiling fluid may be used as the blowing agent by incorporating the low boiling liquid in the polyester and/or isocyanate and using water as the hydrogen donor.

It is also meant from the above discussion that the blowing reaction takes place when the isocyanate and the hydrogen donor are both present at the same time, causing an exothermic reaction.

Forming the Cellular Unsaturated Polyester Resins

The process of the present invention essentially comprises initiating a blowing reaction in the thermosetting unsaturated polyester resin mix to form a gaseous blowing agent and a curing reaction whereby the thermosetting unsaturated polyester resin is solidified. The exothermic heat of the blowing reaction accelerates the curing reaction such that the resin attains a gel state during expansion of the resin by the gaseous blowing agent and cures in an expanded condtiion.

The blowing reaction and curing reaction can be simultaneously initiated or they can be sequentially initiated (with the blowing reaction being initiated first) so long as the resin attains a gel state while it is being expanded by the gaseous blowing agent and cures in the expanded condition. Simultaneous initiation of the blowing and curing reactions is preferred. By "simultaneous initiation" is meant bringing into reactive relationship at substantially the same time the chemical compounds necessary to cause the curing of the polyester resin and the blowing reaction. In order for the curing reaction to occur, the unsaturated polyester resin, the cross-linking monomer and the catalyst must all be present. A promoter will generally also be present. In order for the blowing reaction to occur, the isocyanate and the hydrogen donor (and, in some cases, a blowing agent) must be present. Any method whereby these chemicals are brought together at the same time in the proper amounts as the basic ingredients of the thermosetting polyester resin mix will suffice to bring about a "simultaneous initiation" of the blowing reaction and the curing reaction.

The following chemicals should be kept apart until foaming is desired: (1) the hydrogen donor and isocyanate, and (2) the catalyst and promoter, if the latter is present. For example, in a two-component package of reactants, one component may contain all or part of the necessary polyester resin and cross-linking monomer along with all of the hydrogen donor and promoter, while the other component contains the remainder of the polyester resin and crosslinking monomer along with the catalyst and isocyanate. When the anticipated reaction temperature is above the decomposition and activation temperature of the catalyst, the promoter is unnecessary and all of the polyester resin and cross-linking monomer can be in the first component. If the blowing agent is to be generated by the vaporization of a low boiling liquid, the liquid could be mixed in either or both of the components. When the blowing agent is to be $CO_2$ generated by the reaction of water and an isocyanate then water can be added to the one component containing the hydrogen donor.

In one embodiment of the present invention, the cellular unsaturated thermosetting polyester resins are formed by bringing together two reactant liquid components. The first reactant liquid component can, for example, contain (by weight) from about 200 to about 1200, preferably from about 300 to about 600 parts of the unsaturated polyester resin, from about 20 to about 200, preferably from about 30 to about 80 parts of the vinylic cross-linking monomer, from about 20 to about 900, preferably from about 30 to about 800 parts of the hydrogen donor exothermically reactive with an isocyanate function, and from about 0 to about 3, preferably from about 0 to about 2, parts of the promoter. The second reactant liquid component can contain, on the same basis, from about 0 to about 600, preferably from about 0 to about 400 parts of the unsaturated polyester resin, from about 0 to about 100, preferably from about 0 to about 80 parts of the vinylic cross-linking monomer, from about 20 to about 400, preferably from about 50 to about 300 parts of the isocyanate compound, and from about 3 to about 15, preferably from about 5 to about 12 parts of the catalyst.

The isocyanate compound of the second component is used in an amount stoichiometric to the total active hydrogen in the first component. Often, this amount will be determined only by the amount of hydrogen donor compound present in the first component. However, if the unsaturated polyester resin component contains unreacted hydroxyl groups, these active hydrogens should also be considered in determining the amount of isocyanate to be used in the second component. The amount of the hydrogen donor used in the A component varies somewhat depending upon the flexibility of the final product desired. That is, higher amounts of hydrogen donor are generally used for the more flexible products and smaller amounts used to form more rigid products.

The two components can be combined in any suitable ratio which can, for example, be a ratio of from about 1:1 to about 10:1 or more of the first component (the "A" component) to the second (or "B") component. The ratio can be based on either weight or volume depending generally upon the particular mixing equipment available to the user. Unless otherwise indicated, all ratios used herein are by weight. Generally, as the ratio of A:B increases, the amounts of resin and vinylic cross-linking monomers increase in the A component and decrease in the B component. That is, for a typical 1:1 ratio of A:B, the A component may contain from about 500 to about 800 parts of the said resin and monomer while the B component may contain from about 250 to about 450 parts of the resin and monomer. In a typical 4:1 mix, the B component would generally not contain any resin and monomer, while the A component would contain sufficient resin and monomer to yield the 4:1 weight ratio of the A:B components. In a typical 10:1 mix, the A component would similarly contain sufficient parts of resin and monomer to establish the 10:1 ratio while the B component again would generally not contain any of resin or monomer.

In addition to the chemical constituents named above, either of the two components may contain from about 10 to about 100, preferably from about 20 to about 80 parts of a low boiling liquid such as a halogenated alkane as hereinbefore described in order to form a gaseous blowing agent. Surfactants of various types may also be included in an amount of from about 1 to about 10, preferably from about 2 to about 5 parts to control pore size and cellular structure. The surfactants used in the formation of either closed-cell or open-cell foam products of other polymeric systems, such as those used with foam polyurethane or foam polystyrene, may be used herein. For example, if a closed cell foam is desired, surfactants such as known closed cell-forming silicones, mineral oils and R–150 (a surfactant sold by the Houdry Process Co.) may be used. On the other hand, if foams with open cells are desired, surfactants such as known open cell-forming silicones or fatty acids may be used in order to cause a rupturing of the cells prior to hardening. The appropriate silicones are preferred for either closed cell foams or open cell foams while R–150 is also a preferred closed-cell foam surfactant.

Either of the components may further contain one or more fillers, reinforcing materials and the like. Such fibers include airfloat silica, metal leafing powders such as aluminum leafing powder, copper leafing powder, silver leafing powder, etc., mica dust, titanium dioxide, calcium carbonates, talc, antimony oxides, silica aerogel or other suitable material. These filler materials may be employed individually or in mixtures in total concentrations of from about 1 to about 50 parts by weight of 100 parts by weight of the polyester resin component.

The two components may be brought together in their entirety at ambient temperatures and substantially atmospheric pressure in proportions ranging from about 1:1 to about 10:1 of the A to B component in any convenient manner such as mixing an automatic proportioning machines or by hand, pouring, spraying or frothing into place by appropriate equipment or by hand. By "ambient temperatures" is meant temperatures from about 40° to about 100° F., preferably from about 65° to about 90° F.

The blowing reaction caused by the reaction of the isocyanate and the hydrogen donor proceeds more rapidly than the curing reaction, and when all of the ingredients are combined in the proper amounts, the exotherm heat of the blowing reaction accelerates the curing reaction such that the polyester resin gels or attains a viscosity sufficient to retain its cellular structure whenever the same is formed.

The exothermic heat generated by the blowing reaction of the isocyanate and hydrogen donor components is not only utilized to form a gaseous blowing agent as described above, but helps to bring about the cure of the resin to the proper viscosity to allow formation, uniform distribution and entrapment of bubbles. The bubbles formed from the blowing reaction are uniformly distributed and trapped so as to form cells which remain in the resin until the resin has solidified.

By "terminates" and "termination" is meant the substantial completion of the reaction involved, e.g., from about 85 to 100%, preferably from about 90 to 100%, and most preferably from about 95 to 100% complete. In the case of the blowing reaction, completion is indicated by a tapering off or cessation in the rise or volumetric expansion of the foamed polyester resin. In the case of the curing reaction, completion is indicated by attainment of the maximum or near maximum hardness of the unsaturated thermosetting polyester resin being foamed.

It should be understood that the two components of the present invention may be subdivided into smaller subcomponent parts thus providing in essence a multi-component system.

The present invention is further illustrated by the following examples; all parts and percentages are by weight in the examples and throughout the specification and claims unless otherwise indicated.

EXAMPLE I

A cellular unsaturated thermosetting polyester resin foam product is prepared by mixing together in a 1:1 ratio two components of a thermosetting unsaturated polyester resin mix. The first component (component "A") contains:

500 parts of a thermosetting unsaturated polyester resin containing styrene prepared from the reaction of propylene glycol, maleic anhydride, phthalic anhydride and styrene and having a molecular weight of 8,000, a viscosity of 400 cps., a hydroxyl number of 10, an acid value of 15 and a water content of 0.02%;

50 parts styrene;

110 parts N,N,N',N',-tetrakis-(2-hydroxypropyl)ethylenediamine;

1 part dimethylanaline; and 5 parts of a closed cell-forming surfactant sold under the designation "5410" by the Union Carbide Co.

The second (or "B") component contains:

351 parts of the same resin as the "A" component;

80 parts styrene;

30 parts $CCl_3F$;

200 parts polymethylene polyphenyl isocyanate having the isocyanate equivalent weight of 132; and 5 parts polyfunctional peroxide catalyst sold under the designation "XPD" by the Norac Chemical Co., which is a mixture of 4 parts dichlorobenzoyl peroxide and 1 part benzoyl peroxide.

The two liquid components are mixed at a temperature of about 75° F. and poured into a silicone rubber mold. The resultant foam product after curing has a density of 25 lbs./ft.$^3$ and a flexural modulus of 600,000 p.s.i. The product contains closed cells of approximately 1/64 inch average diameter.

EXAMPLE II

Example I is repeated with the following two liquid components (1:1 ratio):

Component "A"

517 parts thermosetting unsaturated polyester resin containing styrene prepared from the reaction of propylene glycol, maleic anhydride, phthalic anhydride and styrene and having a molecular weight of 9,000, a viscosity of 500 cps., a hydroxyl number of 5, an acid value of 12 and a water content of 0.01%;
100 parts styrene;
73 parts N,N,N',N'-tetrakis - (2-hydroxypropyl)ethylenediamine;
2 parts water;
2 parts lauryl mercaptan; and
5 parts of the silicone surfactant of Example I.

Component "B"

330 parts of the same resin as in component "A";
55 parts styrene;
300 parts of the polymethylene polyphenyl isocyanate of Example I; and
6 parts of the polyfunctional peroxide catalyst of Example I.

The resultant closed-celled unsaturated thermosetting polyester resin foam product after curing has a density of about 30 lbs./ft.$^3$, a flexural modulus of 600,000 p.s.i., and an average cell diameter of about 1/64 inch.

EXAMPLE III

The procedure of Example I are again repeated using the following two liquid components in a 1:1 ratio:

Component "A"

512 parts thermosetting unsaturated polyester resin containing styrene prepared from the reaction of propylene glycol, maleic anhydride, phthalic anhydride and styrene and having a molecular weight of 6,500, a viscosity of 500 cps., a hydroxyl number of 6, an acid value of 14 and a water content of 0.01%;
100 parts styrene;
73 parts N,N,N',N'-tetrakis-(2-hydroxypropyl)-ethylenediamine;
2 parts water;
2 parts lauryl mercaptan; and
5 parts of the silicone surfactant of Example II.

Component "B"

330 parts of the same resin as in Component "A";
25 parts styrene;
30 parts CCl$_3$F;
300 parts of the polymethylene polyphenyl isocyanate of Example I; and
8 parts polyfunctional peroxide catalyst.

The resultant closed-celled unsaturated thermosetting polyester resin foam product after curing has a density of about 15 lbs./ft.$^3$ and a flexural modulus of 500,000 p.s.i. The average cell diameter remains about 1/64 inch.

EXAMPLE IV

The procedures of Example I are repeated with the following two liquid components in a 1:1 ratio:

Component "A"

500 parts of the thermosetting unsaturated polyester resin of Example I;
59 parts styrene;
106 parts of N,N,N',N'-tetrakis-(2-hydroxypropyl)-ethylenediamine;
2 parts lauryl mercaptan;
9 parts water; and
5 parts of the silicone surfactant of Example I.

Component "B"

250 parts of the same resin as in Component "A";
40 parts styrene;
90 parts CCl$_3$F;
300 parts of the polymethylene polyphenyl isocyanate of Example I; and
5 parts of the polyfunctional peroxide catalyst of Example I.

The resultant closed-celled thermosetting unsaturated resin product after curing has a density of 2 lbs./ft.$^3$ and a flexural modulus of 500,000 p.s.i. The average cell diameter is 1/64 inch.

EXAMPLE V

The procedures of Example I are repeated with a 2:1 mix of the following two components:

Component "A"

400 parts of the resin of Example I;
50 parts styrene;
110 parts N,N,N',N'-tetrakis-(2-hydroxypropyl)-ethylenediamine;
1 part lauryl mercaptan; and
5 parts of the silicone surfactant of Example I.

Component "B"

230 parts of the polymethylene polyphenyl isocyanate of Example I;
45 parts CCl$_3$F; and
8 parts of the polyfunctional peroxide catalyst of Example I.

The resulting cellular foam product has closed cells and a density of about 4 lbs./ft.$^3$ after curing.

EXAMPLE VI

A cellular foam product is made from a 4:1 mix of the following two liquid components utilizing the procedures of Example I:

Component "A"

550 parts of the polyester resin of Example I;
50 parts styrene;
73 parts N,N,N',N'-tetrakis-(2-hydroxypropyl)-ethylenediamine;
1 part lauryl mercaptan; and
5 parts silicone surfactant of Example I.

Component "B"

132 parts of the polymethylene polyphenyl isocyanate of Example I;
30 parts CCl$_3$F; and
7 parts of the polyfunctional peroxide catalyst of Example I.

The resulting closed-cell foam product has a density of about 7 lbs./ft.$^3$ after being cured.

EXAMPLE VII

A cellular foam product is formed from the following components in which water is utilized both as the hydrogen donor and as a source of the blowing agent (by reaction with the isocyanate to form carbon dioxide):

Component "A"

500 parts of the polyester resin of Example I;
50 parts styrene;
18 parts water;
1 part lauryl mercaptan; and
5 parts of the silicone surfactant of Example I.

Component "B"

300 parts of the polyester resin of Component "A";
264 parts of the polymethylene polyphenyl isocyanate of Example I; and
10 parts of the polyfunctional peroxide catalyst of Example I.

The two components are mixed in a 1:1 ratio with the same process conditions as Example I. The resulting closed cell foam product has a density of about 6 lbs./ft.$^3$ after curing.

EXAMPLE VIII

A cellular foam product is prepared in the manner of Example I from the following two liquid components in a 1:1 ratio:

Component "A"

464 parts of the polyester resin of Example I;
46 parts styrene;
73 parts N,N,N',N'-tetrakis-(2-hydroxypropyl)-ethylenediamine;
10 parts water;
2 parts lauryl mercaptan; and
5 parts of the silicone surfactant of Example I.

Component "B"

381 parts of the resin of Component "A";
50 parts styrene;
170 parts of the polymethylene polyphenyl isocyanate of Example I;
40 parts CCl$_3$F; and
40 parts of catalyst system (10 parts cumene hydroperoxide catalyst disposed in 30 parts molecular sieve).

The water of Component "A" displaces the cumene hydroperoxide from the pores of the molecular sieve and makes the cumene hydroperoxide available to catalyze the reaction. The displacing water remains in the molecular sieve and does not enter into reaction.

The resulting cellular product has a density of about 8 lbs./ft.$^3$ after being cured.

EXAMPLE IX

A cellular foam plastic is prepared by mixing the following two liquid components in a 1:1 ratio:

Component "A"

500 parts of the polyester resin of Example I;
50 parts styrene;
146 parts N,N,N',N'-tetrakis-(2-hydroxypropyl)-ethylenediamine; and
7 parts silicone surfactant.

Component "B"

329 parts of the polyester resin of Component "A";
60 parts styrene;
265 parts of the polymethylene polyphenyl isocyanate of Example I;
10 parts di-tert-butyl peroxide; and
40 parts CCl$_3$F.

The catalyst (di-tert-butyl peroxide) is a heat-activated catalyst and there is thus no need to include a promoter in Component "A".

The two components are mixed in the same manner as in Example I. The exothermic heat generated by the blowing reaction is sufficient to rapidly raise the temperature of the mass above the approximate temperature of activation of the catalyst, e.g., about 260° F. The resultant cellular polyester foam product has density of about 12 lbs./ft.$^3$ after curing.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A single article containing a two separate component system adapted to react to form a thermosetting unsaturated polyester resin foam product, said article comprising
   a first component comprising a thermosetting unsaturated polyester resin having a molecular weight above about 5,500, a hydroxyl number of less than 20 and an acid value of less than 30, a vinylic cross-linking monomer and a hydrogen donor compound exothermically reactive with a polyisocyanate compound to expand or form and expand a gaseous blowing agent, and
   a second component comprising a thermosetting unsaturated polyester resin having a molecular weight above about 5,500, a hydroxyl number of less than 20 and an acid value of less than 30, a polyisocyanate compound in an amount essentially stoichiometric with the amount of the hydrogen donor compound of the first component and a compatible free radical catalyst unreactive with the polyisocyanate compound and adapted to catalyze the curing reaction of the thermosetting unsaturated polyester resin and vinylic cross-linking monomer; wherein the thermosetting unsaturated polyester resin is present as the major portion of the polyester resin foam product.

2. The two-component system of claim 1 wherein the second component further includes a vinylic cross-linking monomer.

3. The two-component system of claim 2 wherein the first component further includes an amount sufficient to activate the free radical catalyst at about ambient temperatures of a promoter.

4. The two-component system of claim 3 wherein one of said components further includes a blowing agent.

5. The two-component system of claim 1 wherein the polyisocyanate compound of the second component is selected from the group consisting of tolylene diisocyanate, diphenyl diisocyanate, triphenyl diisocyanate, chlorophenyl 2,4-diisocyanate, ethylene diisocyanate, 1,4-tetramethylene diisocyanate, p-phenylene diisocyanate, hexamethylene diisocyanate, 3,3'-dimethyl-4,4'-biphenylene diisocyanate, 3,3'-dimethoxyl-4,4'-biphenylene diisocyanate, polymethylene polyphenylisocyanate and diphenylmethane-4,4'-diisocyanate.

6. The two-component system of claim 1 wherein the hydrogen donor compound of the first component is selected from the group consisting of water, alcohols and amines.

7. The two-component system of claim 5 wherein said first component includes water as said hydrogen donor compound.

8. The two-component system of claim 1 wherein the polyester resin of each component has a hydroxyl number of less than 10 and an acid number less than 15.

9. The two-component system of claim 8 wherein the polyester resin of each component has a hydroxyl number of substantially zero and an acid number of substantially zero.

10. The two-component system of claim 1 wherein the vinylic cross-linking monomer is a monomeric styrene compound.

11. The two-component system of claim 1 wherein the free radical catalyst is a mixture of 4 parts 2,4-dichlorobenzoyl peroxide and 1 part benzoyl peroxide.

12. The two-component system of claim 1 wherein the first component includes from about 200 to about 1200 parts by weight of the thermosetting unsaturated polyester resin, from about 20 to about 200 parts by weight of the vinylic cross-linking monomer, from about 20 to about 90 parts of the hydrogen donor and from about 0 to about 3 parts of a promoter, the second component includes up to about 600 parts by weight of the unsaturated polyester resin, from about 0 to about 100 parts by weight of the vinylic cross-linking monomer, from about 20 to about 400 parts by weight of the isocyanate compound and from about 3 to about 15 parts by weight of the catalyst, the amount of isocyanate in the second component being stoichiometric with the total active hydrogen in the first component.

13. The two-component system of claim 1 wherein the free radical catalyst is disposed within the pores of a molecular sieve catalyst and the first component contains water in an amount sufficient to displace a catalytically-effective amount of the free radical catalyst from the molecular sieve.

14. A method for the formation of a thermosetting unsaturated polyester resin foam product at about ambient temperature wherein the thermosetting unsaturated polyester resin is present as the major portion of the polyester resin foam product which method comprises mixing and curing the two components of the article of claim 1.

15. A method according to claim 14 wherein the polyisocyanate compound is selected from the group consisting of tolylene diisocyanate, diphenyl diisocyanate, triphenyl diisocyanate, chlorophenyl 2,4-diisocyanate, ethylene diisocyanate, 1,4-tetramethylene diisocyanate, p-phenylene diisocyanate, hexamethylene diisocyanate, 3,3'-dimethyl - 4,4' - biphenylene diisocyanate, 3,3'-dimethoxyl-4,4'-biphenylene diisocyanate, polymethylene polyphenylisocyanate and diphenylmethane-4,4'-diisocyanate.

16. A method according to claim 14 wherein the hydrogen donor compound is selected from the group consisting of water, alcohols and amines.

17. A method according to claim 14 wherein the unsaturated thermosetting polyester resin is produced by the reaction of (1) an unsaturated polybasic acid in combination with a saturated polybasic acid, and (2) a polyhydric alcohol.

18. A method according to claim 17 wherein the unsaturated acid is selected from the group consisting of maleic acid, fumaric acid, itaconic acid, citraconic acid, and their corresponding anhydrides.

19. A method according to claim 17 wherein the saturated polybasic acid is present in an amount equivalent to the amount of the unsaturated acid, and is selected from the group consisting of succinic, adipic, sebacic, phthalic, azelaic, tetrahydrophthalic, endomethylene tetrahydrophthalic, isophthalic, tetrachlorophthalic, chlorendic, hexahydrophthalic, glutaric and pimelic acids, and their corresponding anhydrides.

20. A method according to claim 17, wherein the polyhydric alcohol is selected from the group consisting of glycerol, ethylene glycol, diethylene glycol, triethylene glycol, propylene glycol, dipropylene glycol, 1,4-butylene glycol, 1,3-butylene glycol, 2,3-butylene glycol, bis (4-hydroxy phenyl) dimethyl methane, pentaerythritol, 1,4-butadiol, 1,5-pentanediol, and neopentyl glycol.

21. A method according to claim 14 wherein the vinylic cross-linking monomer is a monomeric styrene compound.

22. A method according to claim 14 wherein the free radical catalyst is a mixture of 4 parts of 2,4-dichlorobenzoyl peroxide and 1 part benzoyl peroxide.

23. A method according to claim 22 wherein the peroxide catalyst is activated by a promoter.

24. A method according to claim 23 wherein the promoter is selected from the group consisting of N-N-dimethyl para-toluidine, dimethyl aniline, diethyl aniline, lauryl mercaptan, cobalt naphthenate, and manganese naphthenate.

25. A method according to claim 22 wherein the organic peroxide catalyst is activated by heat.

26. A method according to claim 14 wherein the catalyst is disposed within the pores of a molecular sieve and a displacing fluid is added to displace the catalyst to catalyze the reaction.

27. A method according to claim 26 wherein the displacing fluid is water.

28. A method according to claim 14 wherein the gaseous blowing agent is carbon dioxide which is formed by the reaction of water with the isocyanate.

29. A method according to claim 14 wherein the gaseous blowing agent is formed by the vaporization of a low boiling fluid, the heat of vaporization being substantially caused by the exothermic heat of the blowing reaction.

30. The two-component system of claim 1 wherein the thermosetting polyester resin has a molecular weight of from about 5,500 to about 8,000.

31. The two-component system of claim 30 wherein the thermosetting polyester resin has a molecular weight of from about 6,000 to about 7,500.

32. The method of claim 14 wherein the polyester resin has a hydroxyl number of less than 10 and an acid number less than 15.

33. The method of claim 32 wherein the polyester resin has a hydroxyl number of substantially zero and an acid number of substantially zero.

34. The method of claim 14 wherein the thermosetting polyester resin has a molecular weight of from about 5,500 to about 8,000.

35. The method of claim 34 wherein the thermosetting polyester resin has a molecular weight of from about 6,000 to about 7,500.

References Cited

UNITED STATES PATENTS

| | | | |
|---|---|---|---|
| 2,740,743 | 4/1956 | Pace | 260—2.5 AN |

FOREIGN PATENTS

| | | | |
|---|---|---|---|
| 1,028,908 | 5/1966 | Great Britain | 260—2.5 BE |
| 1,137,465 | 12/1968 | Great Britain | 260—2.5 BE |
| 576,492 | 5/1959 | Canada | 260—2.5 AN |

DONALD E. CZAJA, Primary Examiner

C. WARREN IVY, Assistant Examiner

U.S. Cl. X.R.

260—2.5 AN, 2.5 N